US012629939B2

(12) United States Patent
Lim et al.

(10) Patent No.: US 12,629,939 B2
(45) Date of Patent: May 19, 2026

(54) PRINTHEAD DIE CAP

(71) Applicant: Hewlett-Packard Development Company, L.P., Spring, TX (US)

(72) Inventors: Jui Hong Lim, Singapore (SG); Jian Zhang, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 213 days.

(21) Appl. No.: 18/579,448

(22) PCT Filed: Jul. 16, 2021

(86) PCT No.: PCT/US2021/041989
§ 371 (c)(1),
(2) Date: Jan. 15, 2024

(87) PCT Pub. No.: WO2023/287433
PCT Pub. Date: Jan. 19, 2023

(65) Prior Publication Data
US 2024/0359465 A1 Oct. 31, 2024

(51) Int. Cl.
*B41J 2/165* (2006.01)

(52) U.S. Cl.
CPC ....... *B41J 2/16514* (2024.05); *B41J 2/16508* (2013.01); *B41J 2/16511* (2013.01)

(58) Field of Classification Search
CPC . B41J 2/16514; B41J 2/16508; B41J 2/16511
See application file for complete search history.

(56) References Cited

U.S. PATENT DOCUMENTS

| | | | |
|---|---|---|---|
| 5,404,158 | A | 4/1995 | Carlotta et al. |
| 5,448,270 | A | 9/1995 | Osborne |
| 6,042,216 | A | 3/2000 | Garcia et al. |
| 6,309,044 | B1 | 10/2001 | Gaarder |
| 10,814,634 | B1 | 10/2020 | Rosdahl et al. |
| 2004/0135842 | A1 | 7/2004 | Saksa |
| 2005/0134631 | A1 | 6/2005 | Silverbrook |
| 2013/0215189 | A1 | 8/2013 | Justice et al. |
| 2017/0217185 | A1 | 8/2017 | Wagner et al. |
| 2018/0281416 | A1 | 10/2018 | Clark et al. |

(Continued)

FOREIGN PATENT DOCUMENTS

| | | | |
|---|---|---|---|
| CN | 103237660 | A | 8/2013 |
| CN | 112208212 | A | 1/2021 |

(Continued)

*Primary Examiner* — Justin Seo
(74) *Attorney, Agent, or Firm* — Foley & Lardner LLP

(57) ABSTRACT

In one example in accordance with the present disclosure, a printhead cap system is described. The printhead cap system includes a cap having an elastomer seal to surround a printhead die on a print cartridge. The printhead cap system also includes a variable force capping station to retain the cap. The variable force capping station is to move the cap to 1) a first position wherein the cap exerts a first force on a substrate on which the printhead die is disposed and 2) a second position wherein the cap exerts a second force on the substrate. In an example, the second force is greater than the first force. The printhead cap system also includes a control system to raise the cap from an uncapped position through the first position and the second position.

15 Claims, 13 Drawing Sheets

(56) References Cited

U.S. PATENT DOCUMENTS

| | | | |
|---|---|---|---|
| 2019/0212141 | A1 | 7/2019 | Takada |
| 2020/0369033 | A1* | 11/2020 | Gutberlet ................. B41J 2/175 |
| 2021/0070049 | A1 | 3/2021 | Praharaj |
| 2021/0206168 | A1 | 7/2021 | Raymond et al. |
| 2021/0213739 | A1* | 7/2021 | Sakamoto ............ B41J 2/16552 |

FOREIGN PATENT DOCUMENTS

| | | | |
|---|---|---|---|
| CN | 112440579 | A | 3/2021 |
| JP | 63-254044 | A | 10/1988 |
| SG | 93995 | A1 | 2/2003 |
| WO | 2020/051067 | A1 | 3/2020 |

* cited by examiner

PRINTHEAD DIE CAP

BACKGROUND

A print cartridge is a component of a printing system that ejects drops of print fluid, such as ink, onto a substrate to form text and/or images. The print cartridge includes a number of printheads. Each printhead includes a number of nozzles. In a nozzle, a small volume of print fluid may be held in an ejection chamber. An actuator, such as a thermal actuator, may activate to expel print fluid through an opening onto a substrate. A controller selectively activates the actuators at predetermined times in order to form text and/or images on a substrate.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
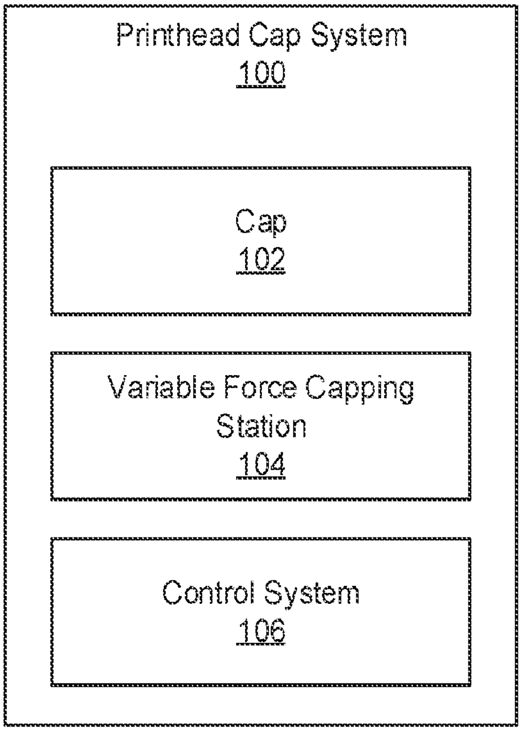
FIG. 1 is a block diagram of a printhead cap system with a variable force printhead cap, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing involves the deposition of a print agent, such as ink, toner, or the like on a substrate in a pattern to form text and/or images. A printhead is a component of a print system that includes a number of ejectors. Through these ejectors, print fluid, such as ink, optimizers, and fusing agent among others, is ejected. Specific examples of devices that rely on printheads include inkjet printers, multi-function printers (MFPs), and additive manufacturing apparatuses (also known as 3D printers). For example, in an additive manufacturing apparatus, the fluid ejection system dispenses fusing agents. The fusing agent is deposited on a build material, which fusing agent facilitates the hardening of build material to form a three-dimensional product.

Other printheads dispense ink on a two-dimensional print medium such as paper. For example, during inkjet printing, ink is directed to a printhead die. Depending on the content to be printed, the device in which the printhead is disposed determines the time and position at which the ink drops are to be released/ejected onto the print medium. In this way, the printhead releases multiple ink drops over a predefined area to produce a representation of the image content to be printed. Besides paper, other forms of print media may also be used.

Accordingly, as has been described, the systems and methods described herein may be implemented in two-dimensional printing, i.e., depositing fluid on a substrate, and in three-dimensional printing, i.e., depositing a fusing agent or other functional agent on a material base to form a three-dimensional printed product.

Additionally, the systems and methods described herein may be implemented in printing systems that incorporate different types of printheads. For example, the ejector may be a firing resistor. The firing resistor heats up in response to an applied voltage. As the firing resistor heats up, a portion of the fluid in an ejection chamber vaporizes to generate a bubble. This bubble pushes fluid out the opening and onto the substrate. As the vaporized fluid bubble pops, fluid is drawn into the ejection chamber from a passage that connects the ejection chamber to a fluid feed slot, and the process repeats. In this example, the printhead may be a thermal inkjet (TIJ) printhead.

In another example, the ejector may be a piezoelectric device. As a voltage is applied, the piezoelectric ejector changes shape which generates a pressure pulse in the ejection chamber that pushes the fluid out the opening and onto the substrate. In this example, the printhead may be a piezoelectric inkjet (PIJ) printhead.

While such printheads undoubtedly have advanced the field of precise fluid delivery, some conditions may impact their effectiveness. For example, inkjet printing systems rely on liquid ink that is ejected from a printhead. To maintain proper functioning of the ejectors, the nozzles of the printhead should be maintained at certain environmental conditions. For example, a low or high humidity environment may cause the nozzles to improperly function. As another example, if a printhead is left exposed for durations of lack of use, print fluid such as ink, may crust over the nozzles, thereby impacting their intended use or operation.

Accordingly, the present specification describes a printhead cap system to maintain a controlled environment. Specifically, the present printhead cap system includes an elastomer cap that may be supported by a compression spring. The elastomer cap is pressed against the printhead around a region of a substrate of the printhead die that includes the nozzles to provide a seal on the surface of the printhead that surrounds the nozzles. Such a cap may prevent the drying out of the nozzles and may also provide a controlled environment with respect to certain environmental parameters such as humidity and pressure.

The printhead cap system also accommodates different capping forces. For example, when not in use, i.e., when not actively printing, the printhead cap system may exert a first force to prevent nozzle dry-out and to maintain desired environmental conditions. At other periods of time, the capping force may be increased. For example, a print cartridge may be "primed" to remove air from the print cartridge.

Priming refers to an operation wherein air in the ink delivery system (e.g., fluid supply lines, pumps, valves, print cartridge fluid paths, ejection chambers, and/or nozzles), such as, by way of non-limiting example, air that may be ingested into the print cartridge via nozzles, is expelled. Air in the ejection chambers and nozzles may impact the quality of printing. For example, when air is in the ejection chambers or nozzles, the air is ejected in place of fluid which may result in less fluid being ejected. This may result in an uneven distribution of fluid on the substrate, which may result in nonuniform coloration or formation of texts and/or images. Additionally, ingested air may also reduce the life of the print cartridge, such as by destroying thermal actuators, such as due to thermal overrun when the actuators are fired while air is in proximity to the thermal actuators of the ejection chamber. Air ingestion may occur under any number of circumstances. For example, in some printing systems a print cartridge, rather than being disposed of following use, is topped off via a fluid tank inside of the printing system. Such a printing system may greatly increase the output of the print cartridge over its life.

In such a continuous fluid supply system, air bubbles may develop in the fluid supply lines and may thus result in air pockets in the reservoir and nozzle during ejection. As another example, due to the negative pressure when the TIJ or PIJ ejectors are vacated, it may be the case that air is ingested into an ejection chamber through an opening in the nozzle.

In any case, the printing system may include a priming system to remove air from the ink delivery system and/or print cartridge. During priming, the cap is placed over the printhead die and a vacuum may generate a negative pressure on the nozzles to draw the air out through the nozzles. To ensure the seal is maintained during a priming event, a higher cap force may be desired.

That is, the cap force used when the printing system is not printing may be insufficient to maintain the seal during priming when a negative pressure is pulled. By comparison, the cap force desired during priming, if used during the more frequent non-printing and non-priming intervals, may cause temporary or permanent damage to the printhead. That is, the printhead may include certain components that are fragile, such as components within the flex circuit on an underside of the print cartridge. The higher capping force which may be provided by a thick elastomer wall may deflect and/or permanently deform the printhead. Were the higher capping force used during priming used at these more frequent non-priming capping intervals, these components of the printhead may be temporarily or permanently damaged. As such, print quality and print cartridge and printhead life may suffer.

Accordingly, the present specification describes a multi-force cap system. Specifically, when the printing system is idle but not in a priming cycle, the printhead cap system may exert a first force. In the event a priming cycle is initiated, the printhead cap system may exert a second force, which is greater than the first force, and which ensures the seal around the nozzles is maintained during the priming event. Put another way, rather than providing a capping system with just one capping force, whether that capping force is a non-priming capping force or a higher value capping force, the present specification describes a multi-force printhead cap system. When the print cartridge is not active, it is capped by the first force and is placed under a higher capping force just when a priming event is triggered. As the priming event may be infrequent, for example around twenty times over the course of life of the print cartridge, the exposure of the printhead to the higher capping force is reduced. This multi-variable capping force may be implemented in a variety of ways as described in the examples and figures that follow.

Specifically, the present specification describes a printhead cap system. The printhead cap system includes a cap with an elastomer seal to surround a printhead die on a print cartridge. The printhead cap system also includes a variable force capping station to retain the cap. The variable force capping station is to move the cap to 1) a first position wherein the cap exerts a first force on a substrate on which the printhead die is disposed and 2) a second position wherein the cap exerts a second force on the substrate. In an example, the second force is greater than the first force. The printhead cap system also includes a control system to raise the cap from an uncapped position through the first position and the second position.

The present specification also describes a method. According to the method, a print cartridge of a printing system is aligned with a variable force capping station. A cap which includes an elastomer seal to surround a printhead die of the printhead cartridge, is elevated to a first position to deform the elastomer seal against an underside of the print cartridge. The cap is further elevated to a second position to further deform the elastomer seal against the underside of the print cartridge.

The present specification also describes a printing system. The printing system includes a print cartridge to eject a fluid. The print cartridge is to be moveable between a printing zone to a capping zone adjacent the printing zone. The printing system also includes a printhead cap system. The printhead cap system includes a cap with an elastomer seal to surround a printhead die on the print cartridge and a variable force capping station. In this example, the variable force capping station includes a cap sled to retain the cap and move in a first direction to interact with a priming shuttle ramped slot to raise the cap to a first position and a priming shuttle to retain the cap sled and move in a second direction to interact with a base ramped slot to raise the cap to the second position. The printing system also includes a control system to move the cap sled and the priming shuttle in the first and second directions, respectively.

Such systems and methods 1) provide different capping forces when the printing system is in different states, i.e., an idle but non-priming state and a priming state; 2) avoid repeated and long exposure to high capping forces on the printhead; 3) provide a controlled environment for the printhead when not in use; and 4) prevent nozzle dry out. However, it is contemplated that the systems and methods disclosed herein may address other matters and deficiencies in a number of technical areas.

Turning now to the figures, FIG. 1 is a block diagram of a printhead cap system (100) with a variable force printhead cap (102), according to an example of the principles described herein. As described herein, the printhead cap system (100) is to cap a printhead of a print cartridge. As used in the present specification and in the appended claims, the term print cartridge may refer to a stationary print cartridge, such as a print bar or a scanning cartridge. In the example where the print cartridge is stationary, the variable force capping station (104) may move to align the cap (102) underneath the stationary print cartridge. In another example, the print cartridge may be a scanning cartridge that is coupled to a carriage and moves over the substrate. In this example, the carriage may move the print cartridge (102) to a position over the cap (102). At this point, the cap (102) may be raised to provide the described capping functionality.

In either case, the printhead cap system (100) includes a cap (102) that has an elastomer seal to surround a printhead die on a print cartridge. When capped, the elastomer seal portion of the cap (102) deforms against the substrate and around the printhead die. As it surrounds the printhead die, the cap (102) provides a controlled pressure and humidity environment in a region surrounding the nozzles such that the do not dry out and are not negatively impacted by the effects of undesirable environmental conditions.

As described above, the cap (102) is disposed on a variable force capping station (104) which retains the cap (102) and moves the cap (102). Specifically, the printhead may be on an underside of the print cartridge. After the cap (102) is aligned underneath the print cartridge to surround the printhead die, the variable force capping station (104) may raise the cap (102) into a variety of capping positions. As such, the variable force capping station (104) may include a platform on which the cap is disposed. A motor coupled to the platform may operate to raise or lower the platform. That is, the variable force capping station (104) may include any number of gears, belts, or other mechanisms to convert a rotational motion of a motor into a translational motion.

Specifically, the variable force capping station (104) may move the cap to a first position wherein the cap (102) exerts a first force on a substrate on which the printhead die is disposed. At a different point in time, for example during a priming event, or in anticipation of a priming event, the variable force capping station (104) may move the cap (102) to a second position wherein the cap exerts a second force on the substrate. In a specific example, the first and second positions may be defined in a vertical direction. That is, the variable force capping station (104) may elevate the cap (102) to a first position and may further elevate the cap (102) to a second position.

As described above, the second force may be greater than the first force and may be used during print cartridge priming. That is, the cap (102) may be in the first position when the print cartridge is idle or inactive and is not in a priming cycle. The cap (102) may be in the second position during printhead priming when a greater capping force is desired. In this second position, the print cartridge is positioned and has a sufficient seal to accommodate a priming operation.

In an example, the first capping force, during idle and non-priming intervals, may be 1.5 Newtons (N) whereas the second capping force, during priming intervals, may provide a 3.5 N force. As described above, as the printhead is exposed to the greater capping force just during priming intervals, and not others, the printhead is exposed to the headland stress for a reduced amount of time, thus increasing the printhead reliability performance.

The printhead cap system (100) also includes a control system (106) to raise the cap (102) from an uncapped position, through the first position and the second position. The control system (106) may include a processor and memory to receive instructions, for example from a user, and execute the instructions to operate the motor to move the variable force capping station (104) as described. For example, the control system (106) may receive an indication that a print operation has terminated and may control the motor to move the capping station (104) to elevate the cap (102) to the first position. The control system (106) may also receive a directive to execute a priming operation and controls the motor to move the capping station (104) to elevate the cap (102) to the second position.

As described above, the control system (106) may include various hardware components, which may include a processor and memory. The processor may include the hardware architecture to retrieve executable code from the memory and execute the executable code. As specific examples, the control system (106) as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the control system (106) cause the control system (106) to implement at least the functionality of moving the variable force capping station (104) and cap (102).

Figure 2:
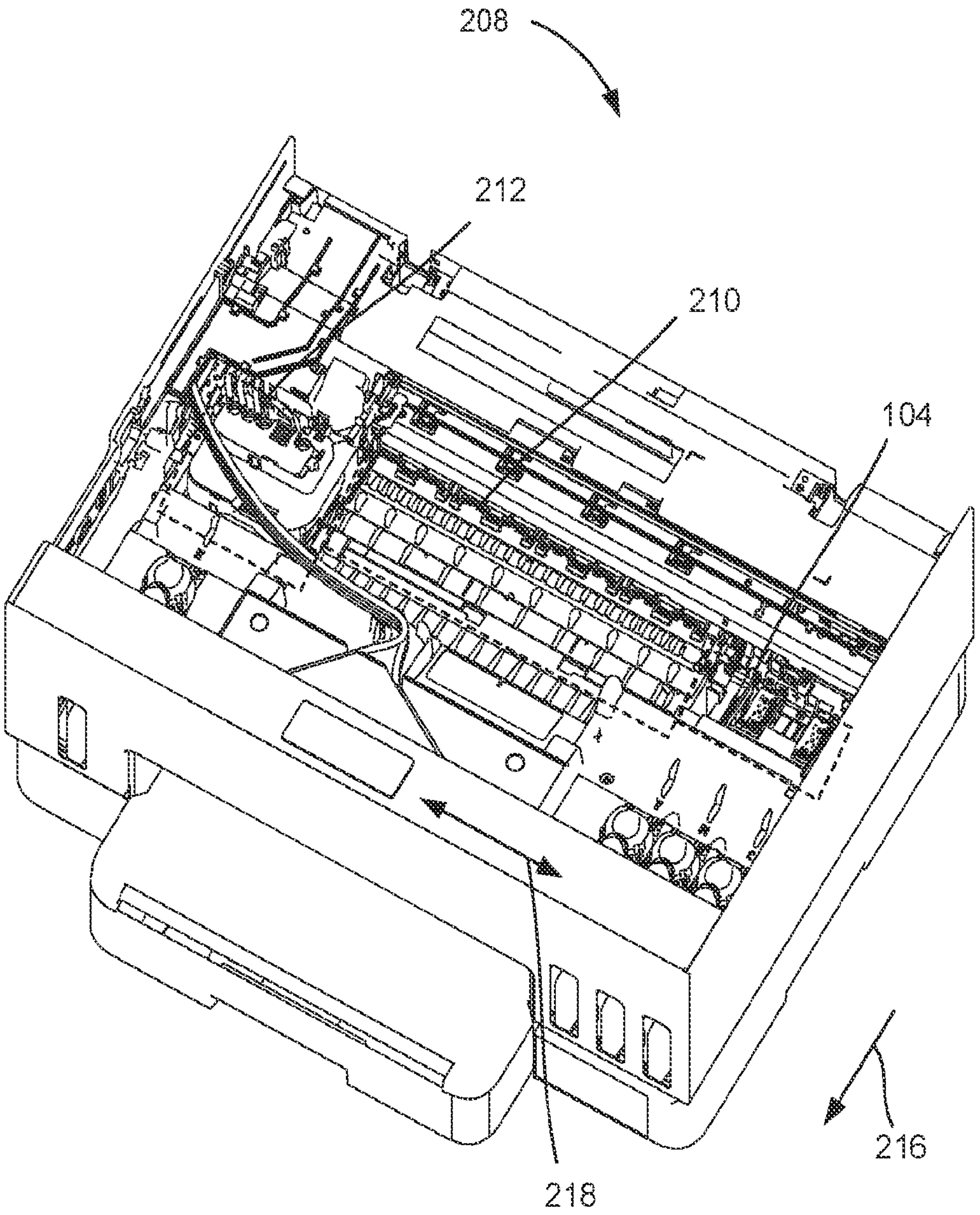
FIG. 2 is an isometric view of a printing system with a variable force printhead cap, according to an example of the principles described herein.

FIG. 2 is an isometric view of a printing system (208) with a variable force printhead cap (FIG. 1, 102), according to an example of the principles described herein. As described above, the printing system (208) may have a stationary print cartridge (212) or may have a scanning print cartridge (212). FIG. 2 depicts an example of a scanning type print cartridge (212). In the example depicted in FIG. 2, the print cartridge (212) may scan across a print zone (210) in a direction (218) indicated by the arrow to deposit the print fluid on the substrate. While being printed on, the substrate moves in a direction (216) indicated by the arrow to an output tray.

In this example, the print cartridge (212) may be transported from the printing zone (210) to the variable force capping station (104) when idle and during priming events. Once disposed over the variable force capping station (104), the capping and/or priming may be executed as described below. While FIG. 2 depicts a particular example of a printing system (208), other printing systems (208) such as those that implement a stationary print cartridge (212), may also include the printhead cap system (FIG. 1, 100) described herein. In these examples, the variable force capping station (104) may be transported to align with the stationary print cartridge (212).

Figure 3:
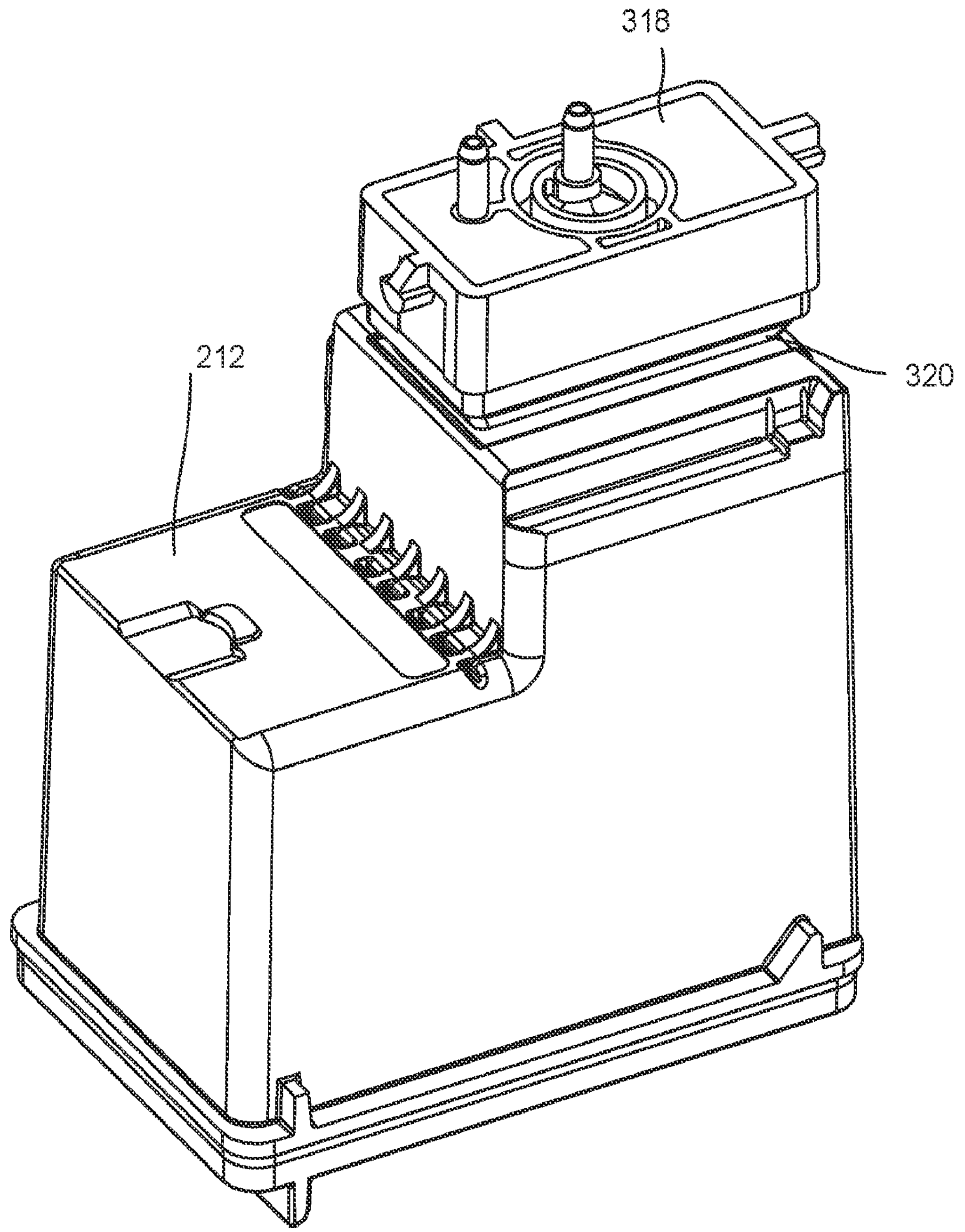
FIG. 3 is an isometric view of a print cartridge with a variable force printhead cap, according to an example of the principles described herein.

FIG. 3 is an isometric view of print cartridges (212-1, 212-2) with variable force printhead caps (FIG. 1, 102), according to an example of the principles described herein. As described above, the print cartridge (212) may refer to a component of a printing system (FIG. 2, 208) that retains fluid and that includes the printhead from which the fluid is ejected. In some examples, the print cartridges (212) may be removable from the printing system (FIG. 2, 208) to be discarded when their respective reservoirs are empty. In other examples, the printing system (FIG. 2, 208) may include larger reservoirs of print fluid that re-supply the print cartridges (212) with print fluid continuously.

In either example, the printing system (FIG. 2, 208) may include a printhead cap system (FIG. 1, 100) which includes printhead caps (FIG. 1, 102). FIG. 3 depicts a printhead cap (FIG. 1, 102) including a cap body (318) and an elastomer seal (320). The elastomer seal (320) may envelop the nozzle region of a substrate of the printhead die. That is, the elastomer seal (320) may form a continuous path that, once against the substrate, surrounds the printhead nozzles to generate a seal to provide controlled environmental conditions surrounding the nozzles when not in use and to maintain a seal during priming.

As described above, the elastomer seal (320) may be formed of a compliant material such as rubber that deforms in response to an applied force. As such, when the variable force capping station (FIG. 1, 104) raises the cap (FIG. 1, 102), the elastomer seal (320) deforms against the substrate to form the enclosed environment around the printhead die.

Figure 4:
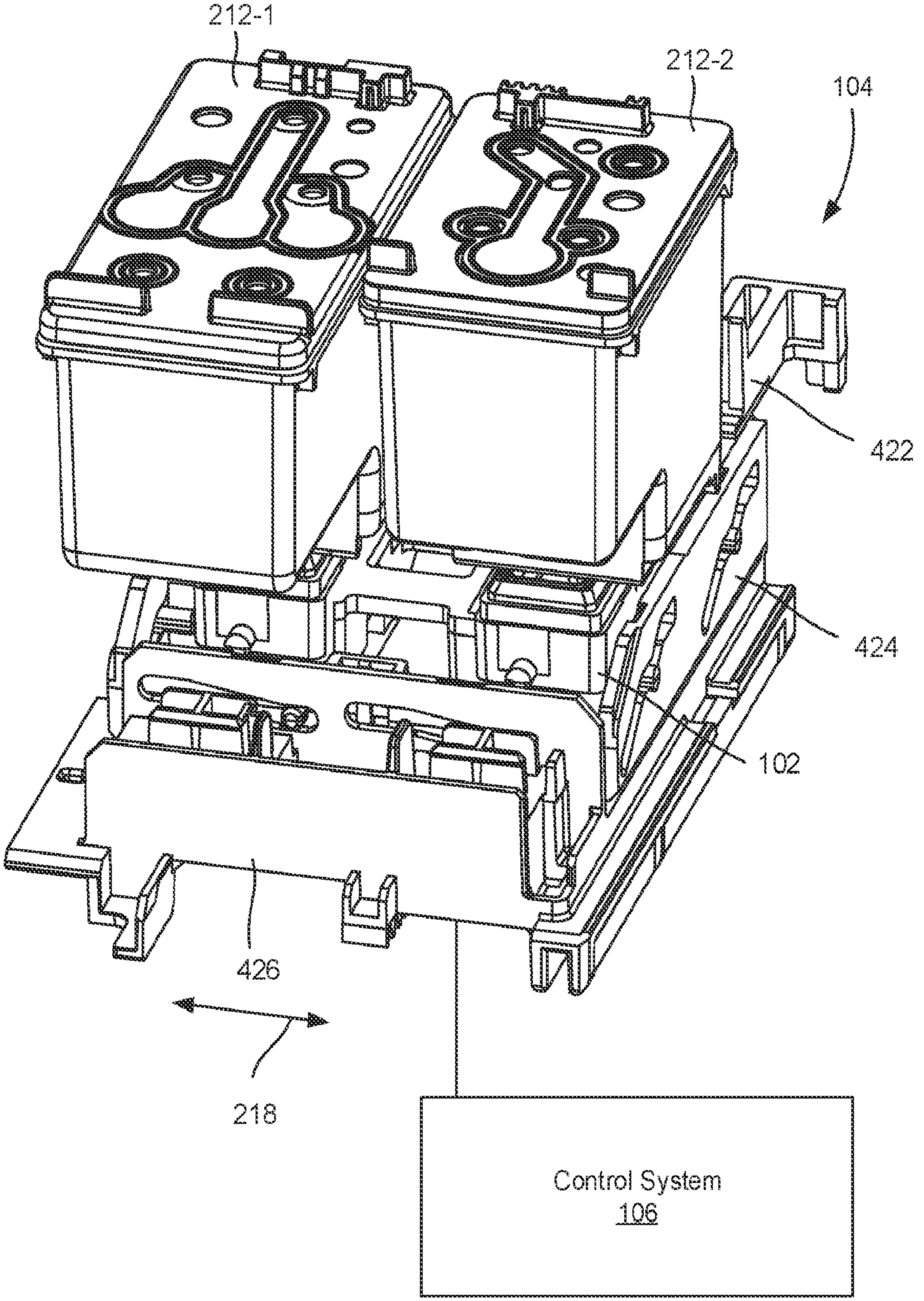
FIG. 4 is an isometric view of a printhead cap system with a variable force printhead cap, according to an example of the principles described herein.

FIG. 4 is an isometric view of a portion of a printing system (FIG. 2, 208), according to an example of the principles described herein. As described above, the printing system (FIG. 2, 208) includes a print cartridge (212) to eject a fluid. As described above, in some examples such as that depicted in FIG. 2, the print cartridge (212) may be moveable between a printing zone (FIG. 2, 210) to a capping zone adjacent the printing zone (FIG. 2, 210). FIG. 4 also depicts the cap that includes the elastomer seal (FIG. 3, 320) that surrounds a printhead die on the print cartridge (212).

As described above, the printing system (FIG. 2, 208) may include a mechanism to align the print cartridges (212-1, 212-2) with the printhead variable force capping station (104). FIG. 4 depicts the positional arrangement of these components. FIG. 4 also depicts the various components that may be implemented to facilitate the raising of the cap (FIG. 1, 102) against the printhead die of the print cartridges (212). Specifically, the variable force capping station (104) may include a cap sled (422) which retains the cap (102) and moves in a first direction (216), which direction may be similar to the direction of media travel. The cap sled (422) may include pins that, as the cap sled (422) is moved in the first direction, interact with a ramped slot in a priming shuttle (424). The interaction between the cap sled (422) pins and the priming shuttle (424) ramped slot provides one mechanism of moving the cap (FIG. 1, 102) through different positions relative to the print cartridges (212).

FIG. 4 also depicts the priming shuttle (424) which retains the cap sled (422) and moves in a second direction (218), which direction may be perpendicular to the direction of media travel. The priming shuttle (424) may include pins that, as the priming shuttle (424) is moved in the second direction, interact with a ramped slot in a base (426). The interaction between the priming shuttle (424) pins and the base (426) ramped slot provides another mechanism of moving the cap (FIG. 1, 102) through different positions relative to the print cartridges (212).

Note that either of these mechanisms may be used independently to move the cap (FIG. 1, 102) towards a respective print cartridge (212). In an example, these mechanisms may be used in combination to move the cap (FIG. 1, 102) to various positions relative to the print cartridges (212). FIG. 4 also depicts the control system (106) to move the cap sled (422) and the priming shuttle (424) in the first and second directions, respectively.

Figure 5:
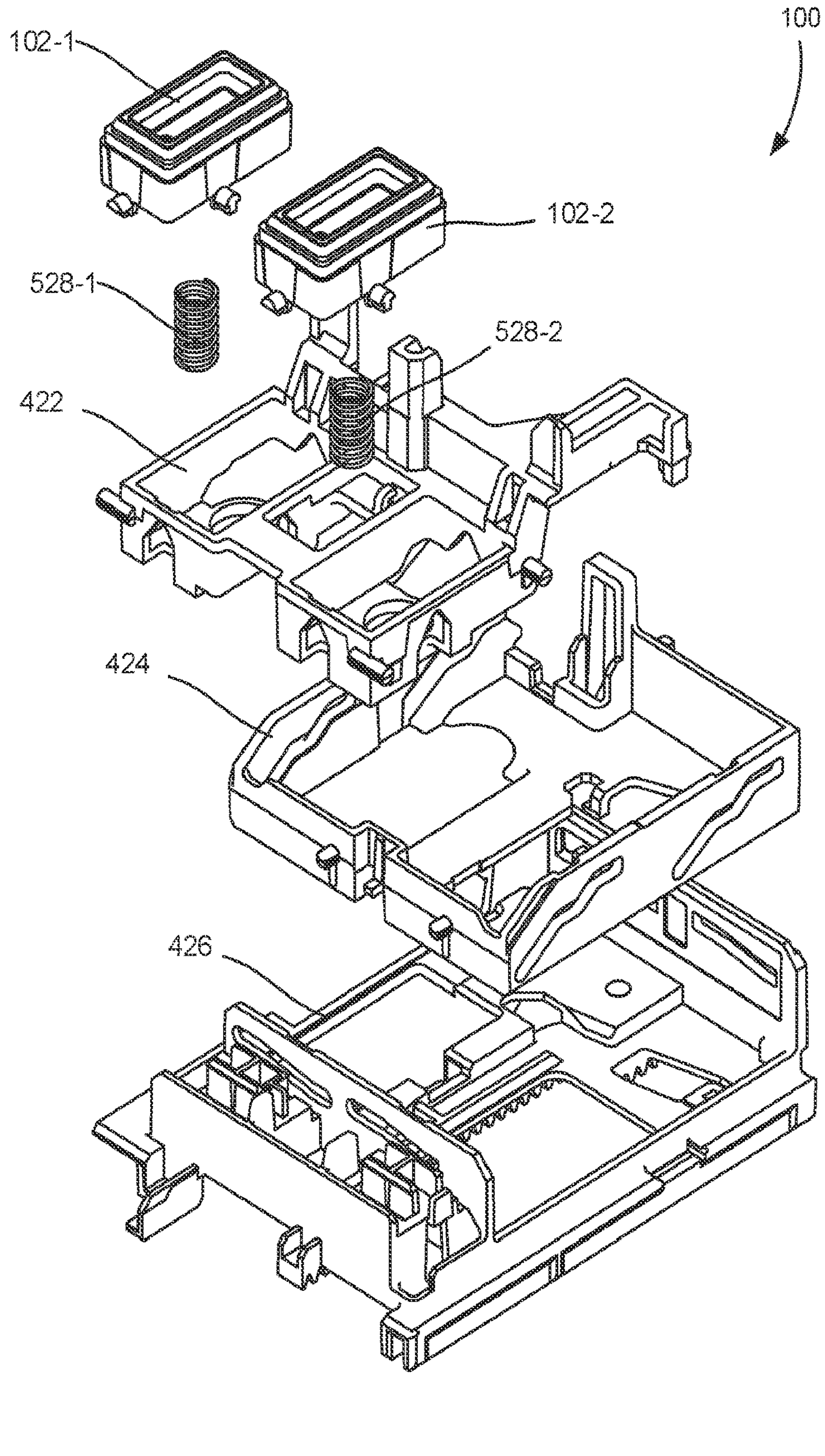
FIG. 5 is an exploded view of a printhead cap system with a variable force printhead cap, according to an example of the principles described herein.

FIG. 5 is an exploded view of a printhead cap system (100) with a variable force printhead cap (102), according to an example of the principles described herein. Specifically, FIG. 5 depicts the caps (102-1, 102-2) that align with, and press against, respective print cartridges (FIG. 2, 212-1, 212-2). FIG. 5 also depicts a relationship between the cap sled (422), priming shuttle (424), and the base (426) as described above. FIG. 5 also depicts the springs (528-1. 528-2) that produce the force between the elastomer seal (FIG. 3, 320) and the printhead die of the print cartridges (FIG. 2, 212). In addition to the two mechanisms (i.e., cap sled pin/priming shuttle ramped slot interaction and priming shuttle pin/base ramped slot interaction) previously described, the springs (528) may provide an additional mechanism to apply a force to push the cap (102) against the print cartridges (FIG. 2, 212).

Figure 7:
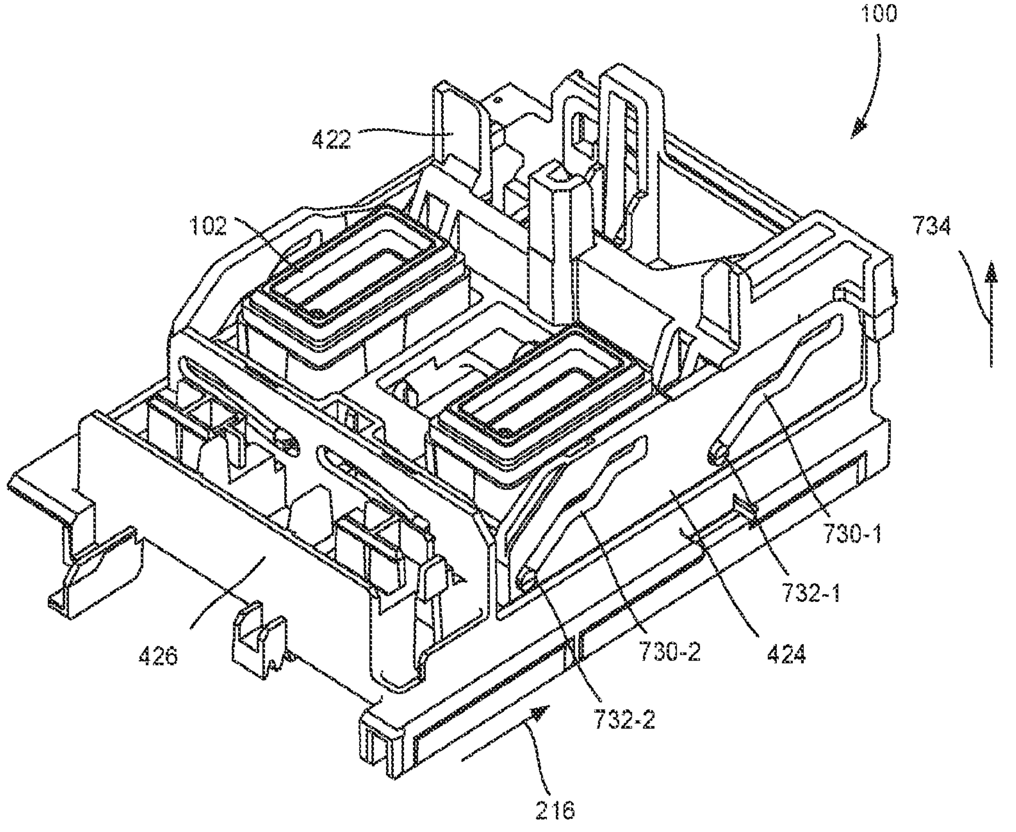
FIG. 7 is an isometric view of a printhead cap system with a variable force printhead cap, according to an example of the principles described herein.
Figure 8:
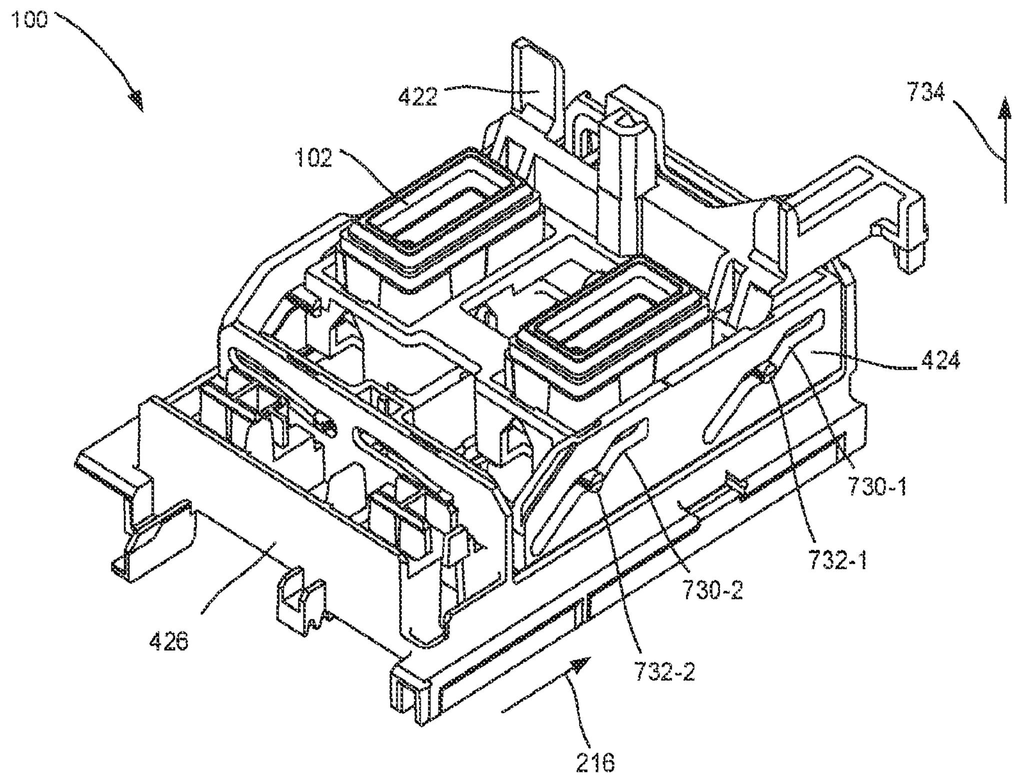
FIG. 8 is an isometric view of a printhead cap system with a variable force printhead cap, according to an example of the principles described herein.
Figure 9:
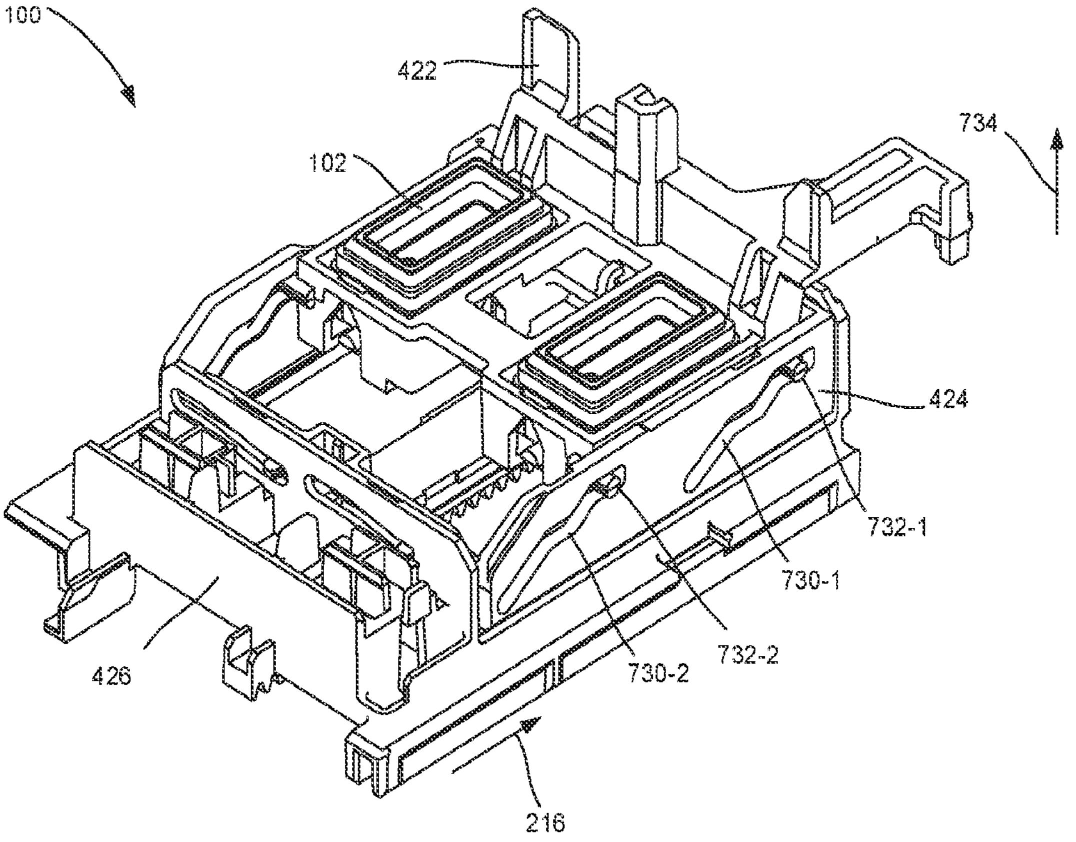
FIG. 9 is an isometric view of a printhead cap system with a variable force printhead cap, according to an example of the principles described herein.
Figure 10:
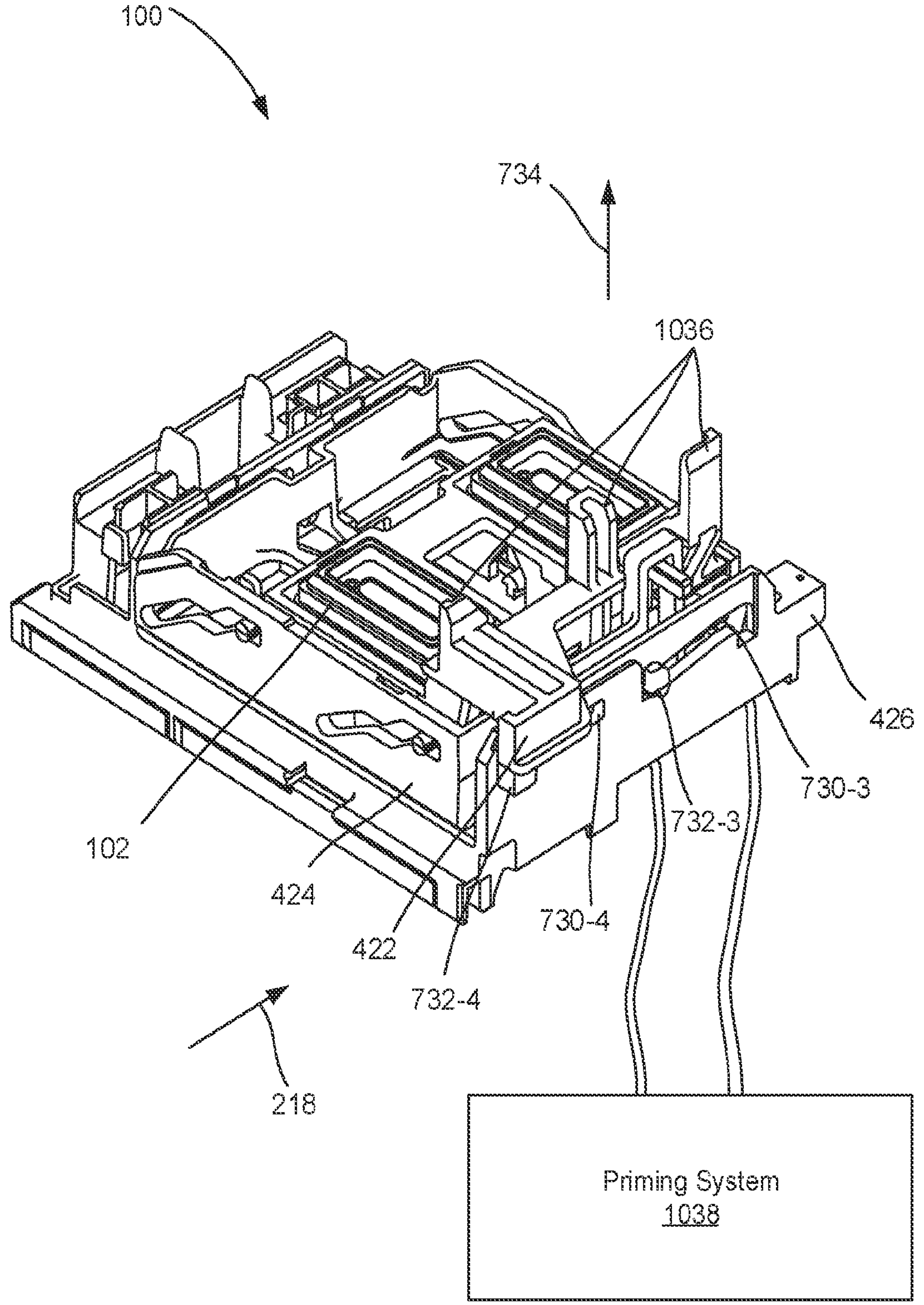
FIG. 10 is an isometric view of a printhead cap system with a variable force printhead cap, according to an example of the principles described herein.
Figure 11:
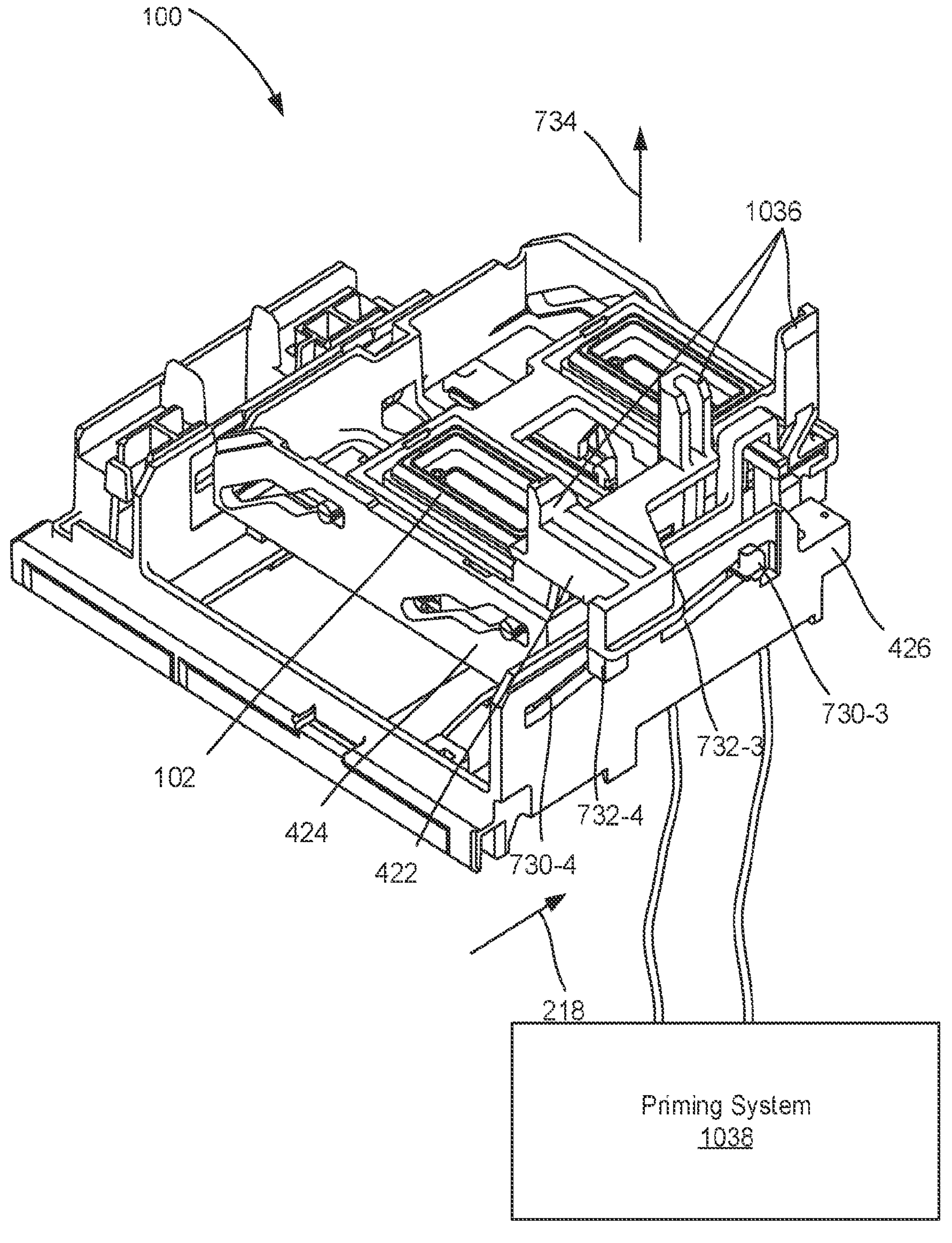
FIG. 11 is an isometric view of a printhead cap system with a variable force printhead cap, according to an example of the principles described herein.
Figure 12:
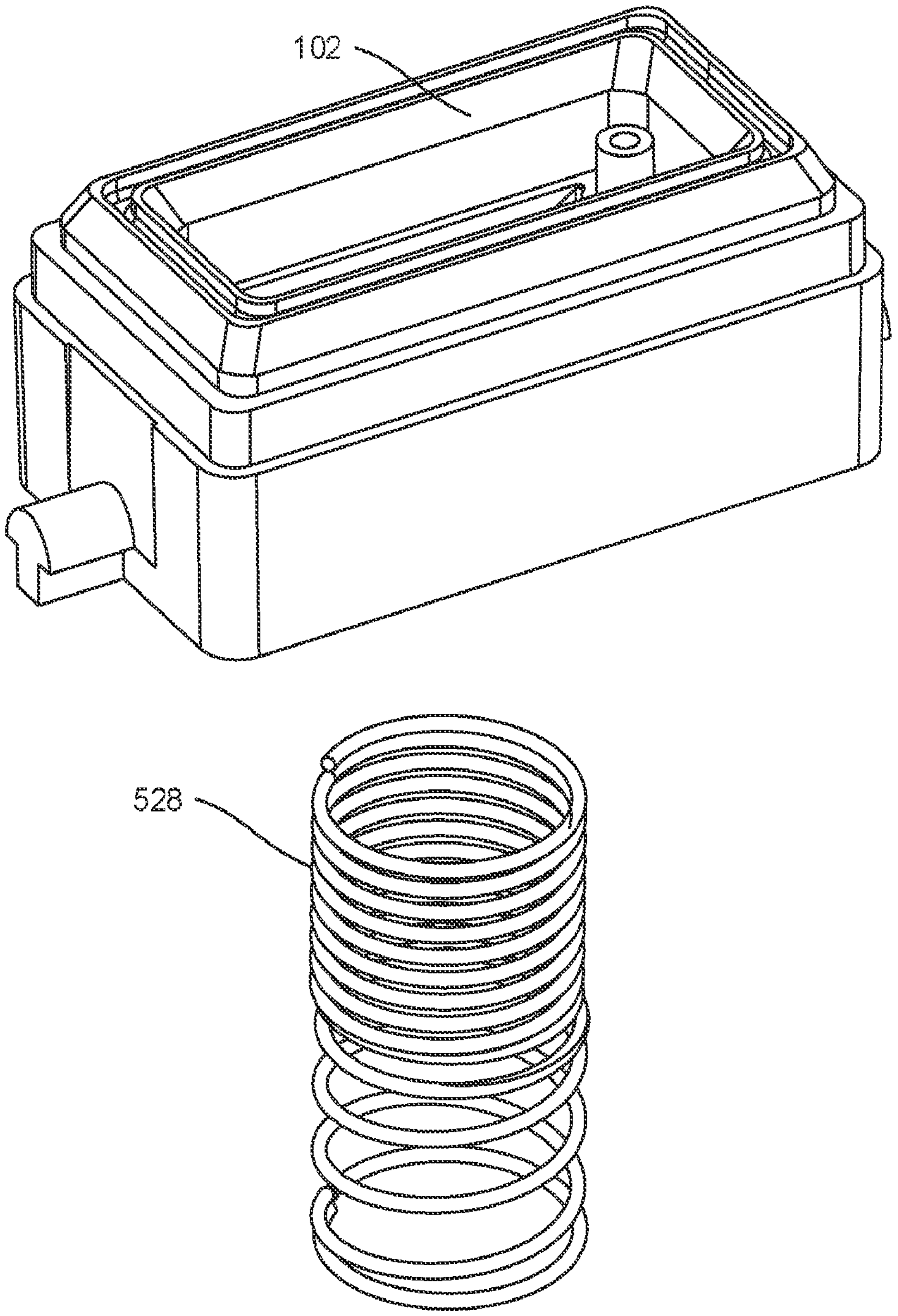
FIG. 12 is an exploded view of a cap and a nonlinear spring, according to an example of the principles described herein.
Figure 13:
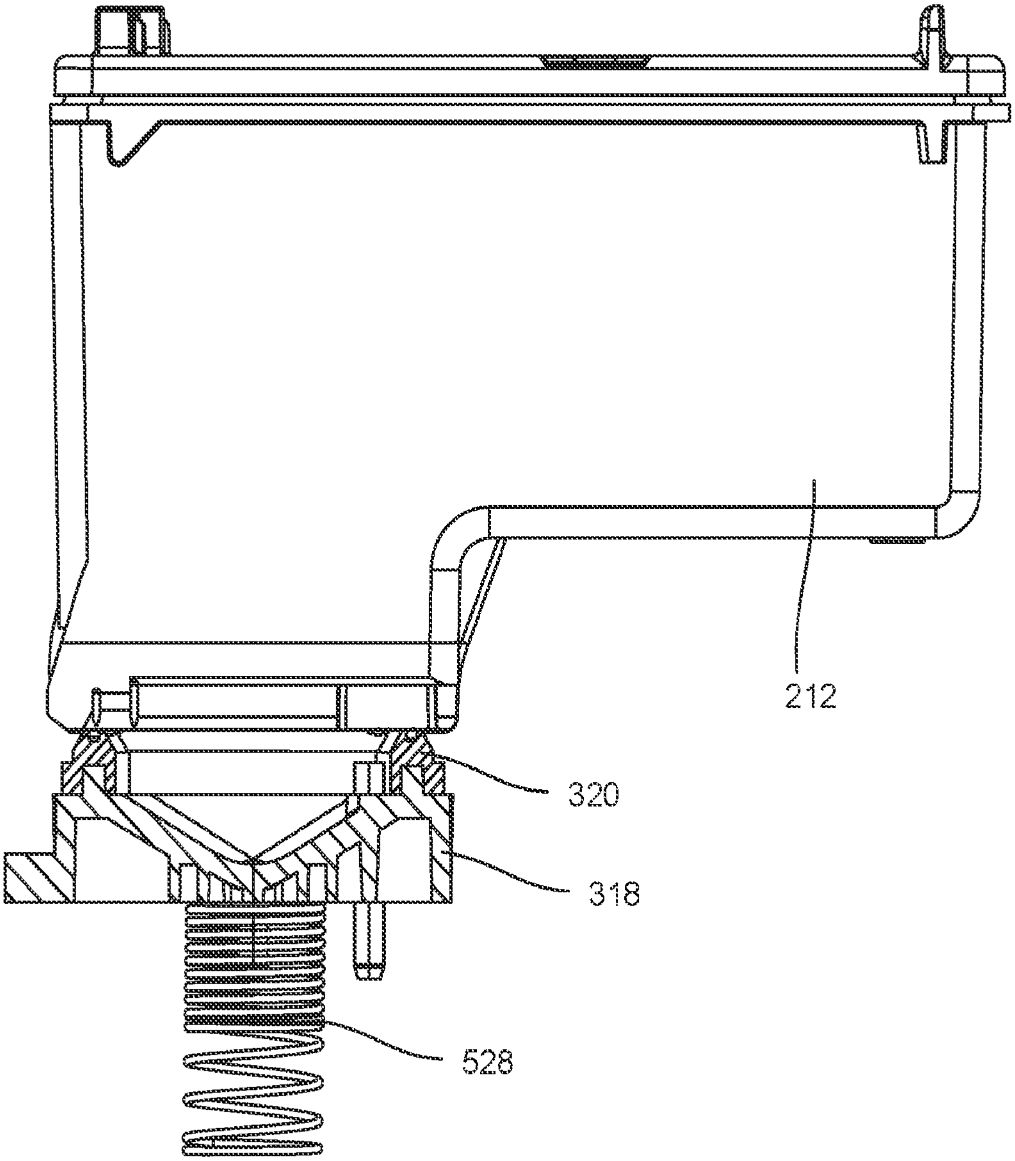
FIG. 13 is a cross-sectional view of a cap and a nonlinear spring, according to an example of the principles described herein.

That is, the springs (528) may be nonlinear springs that have different spring constants along their length. Accordingly, a first portion, with a first and lower spring constant, may be first compressed to provide a first force between the elastomer seal (FIG. 3, 320) and the print cartridge (FIG. 2, 212). When further elevated, the second portion, with a second and higher spring constant, may be compressed to provide the second force between the elastomer seal (FIG. 3, 320) and the print cartridge (FIG. 2, 212). That is, the variable force capping station (104) may include a nonlinear spring (528) disposed between a cap (102) and a cap sled (422) of the variable force capping station (104). Compression of a first portion of the nonlinear spring (528) provides the first force while compression of a second portion of the nonlinear spring (528) provides the second force. Additional detail regarding the nonlinear spring (528) is provided below in connection with FIG. 12. In summary, FIGS. 7-9 depict a first mechanism for moving the cap (FIG. 1, 102) towards the spring, FIGS. 10 and 11 depict a second mechanism, and FIGS. 12 and 13 depict a third mechanism. Each of these mechanisms may be used individually or collectively to move the cap (102) through a series of positions where the cap (102) is pressed against the printhead die with different forces at each position.

Figure 6:
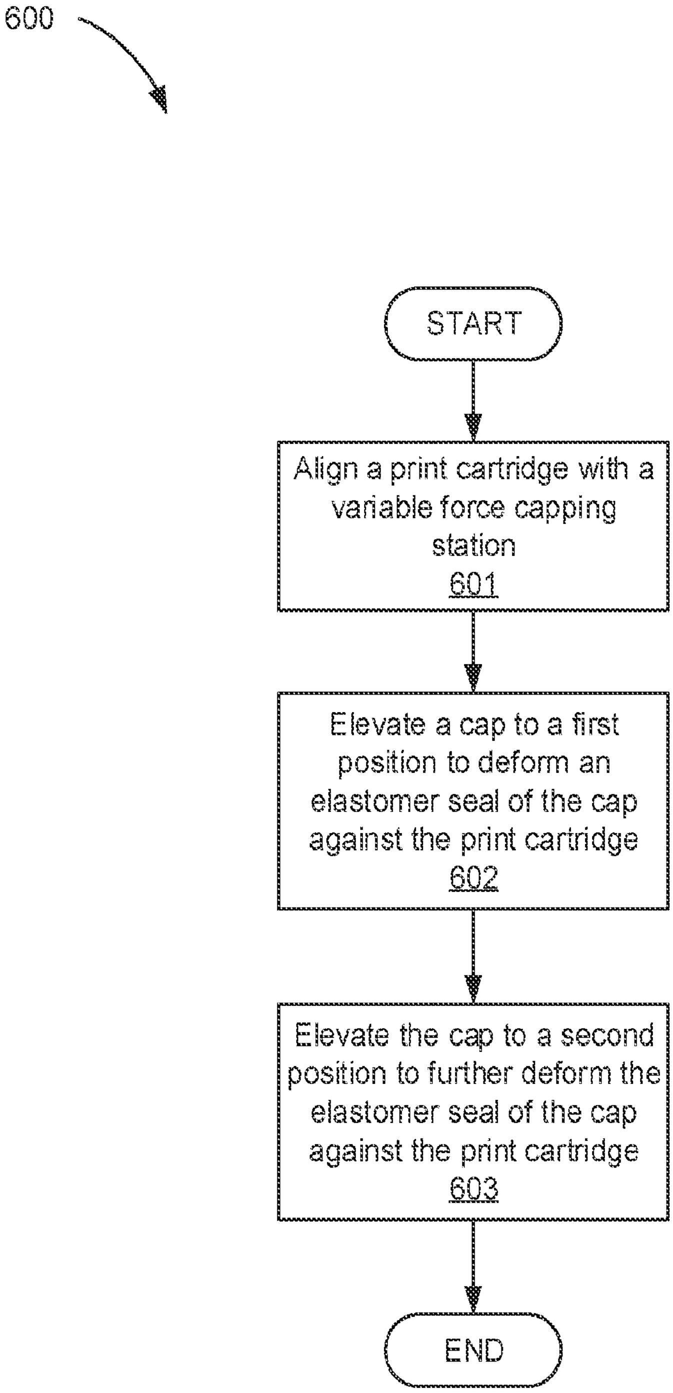
FIG. 6 is a flow chart of a method for capping a print cartridge, according to an example of the principles described herein.

FIG. 6 is a flow chart of a method (600) for capping a print cartridge (FIG. 2, 212), according to an example of the principles described herein. According to the method (600), a print cartridge (FIG. 2, 212) is aligned (block 601) with a variable force capping station (FIG. 1, 104). In some examples, this may include transporting the print cartridge (FIG. 2, 212) of the printing system (FIG. 2, 208) from a printing zone (FIG. 2, 210) to the variable force capping station (FIG. 1, 104) which is adjacent the printing zone (FIG. 2, 210). Once aligned with the print cartridge (FIG. 2, 212), the cap (FIG. 1, 102) may be elevated (block 602) to a first position to deform the elastomer seal (FIG. 3, 320) of the cap (FIG. 1, 102) against an underside of the print cartridge (FIG. 2, 212). As described above, the cap (FIG. 1, 102) may be maintained in this position, exerting the first force which for example may be 1.5 N, when the print cartridge (FIG. 2, 212) is inactive, but not in a priming cycle.

The cap (FIG. 1, 102) may be further elevated (block 603) to a second position to further deform the elastomer seal (FIG. 3, 320) of the cap (FIG. 1, 102) against the underside of the print cartridge (FIG. 2, 212). As described above, the cap (FIG. 1, 102) may be maintained in this position, exerting the second force which may be 4.5 N for example, when the print cartridge (FIG. 2, 212) is in a priming position.

FIG. 7 is an isometric view of a printhead cap system (FIG. 1, 100) with a variable force printhead cap (102), according to an example of the principles described herein. For simplicity, in FIG. 7 one instance of a cap (102) is depicted with a reference number. As described above, FIGS. 7-9 depict a first mechanism wherein a cap (102) is elevated to deform against the print cartridge (FIG. 2, 212). Specifically, in this example, the cap sled (422) includes pins (732-1, 732-2) to interact with ramped slots (730-1, 730-2) of the priming shuttle (424).

In this example, the ramped slots (730-1, 730-2) in the priming shuttle (424) have three stable positions. First, FIG. 7 depicts the cap sled (422) in a first stable position. FIG. 8 depicts the cap sled (422) in a second stable position and FIG. 9 depicts the cap sled (422) in a third stable position. In an example, the cap (102) may be in the second stable position when the print cartridge (FIG. 2, 212) is in an idle and non-priming interval and the cap (102) may be in the third stable position when the print cartridge (FIG. 2, 212) is in a priming interval. In another example, the cap (102) may be in the third stable position when the print cartridge (FIG. 2, 212) is in an idle and non-priming interval and the cap (102) may be in the position depicted in FIG. 11 when the print cartridge (FIG. 2, 212) is in a priming interval.

As depicted in FIGS. 7-9, the cap sled (422) translates in a first direction (216). As the slots (730-1, 730-2) are ramped, the cap sled (422) also elevates in a vertical direction (734) indicated by the arrow. In the example depicted in FIGS. 7-9, the control system (FIG. 1, 107) is to move the cap sled (422) in a first direction (216) such that an interaction between the pins (732-1, 732-2) on the cap sled (422) and the ramped slots (730) in the priming shuttle (424) is to move the cap sled (422) and cap (102) upwards towards the print cartridge (FIG. 2, 212).

FIG. 8 is an isometric view of a printhead cap system (FIG. 1, 100) with a variable force printhead cap (FIG. 1, 102), according to an example of the principles described herein. As depicted in FIG. 8, the control system (FIG. 1, 106) has translated the cap sled (422) in a first direction (216) and due to the interaction between the pins (732-1, 732-2) in the cap sled (422) and the ramped slots (730-1, 730-2) in the priming shuttle (424), the cap sled (422) not only translates in the first direction (216), but is also at a higher position along the vertical direction (734).

FIG. 9 is an isometric view of a printhead cap system (FIG. 1, 100) with a variable force printhead cap (FIG. 1, 102), according to an example of the principles described herein. As depicted in FIG. 9, the control system (FIG. 1, 106) has further translated the cap sled (422) in a first direction (216) and due to the interaction between the pins (732-1, 732-2) in the cap sled (422) and the ramped slots (730-1, 730-2) in the priming shuttle (424), the cap sled (422) not only translates in the first direction (216), is also at an even higher position along the vertical direction (734). Note that in the example depicted in FIGS. 7-9, the priming shuttle (424) is translationally coupled to the base (426) in the first direction (216). That is, while the cap sled (422) has moved relative to the priming shuttle (424) and the base (426) along the first direction (216), the priming shuttle (424) has not moved relative to the base (426) along this first direction (216).

FIG. 10 is an isometric view of a printhead cap system (FIG. 1, 100) with a variable force printhead cap (102), according to an example of the principles described herein. As described above, FIGS. 10 and 11 depict a second mechanism wherein a cap (102) is elevated to deform against the print cartridge (FIG. 2, 212). Specifically, in this example, the priming shuttle (424) includes pins (732-3, 732-4) to interact with ramped slots (730-3, 730-4) of the base (426). In an example, the cap (102) may be in this orientation when the print cartridge (FIG. 2, 212) is in an idle and not priming position.

As depicted in FIGS. 10 and 11, the priming shuttle (424) translates in a second direction (218), which second direction (218) is perpendicular to the first direction (216). As the slots (730-3, 730-4) are ramped, the priming shuttle (424) also elevates in a vertical direction (734) indicated by the arrow. In the example depicted in FIGS. 10 and 11, the control system (FIG. 1, 106) is to move the priming shuttle (424) in a second direction (218) such that an interaction between the pins (732-3, 732-4) in the priming shuttle (424) and the ramped slots (730-3, 730-4) in the base (426) are to move the priming shuttle (424) and cap (102) upwards towards the print cartridge (FIG. 2, 212).

FIGS. 10 and 11 also depict other components. Specifically, FIG. 10 depicts protrusions (1036) to interact with the print cartridges (FIG. 2, 212) to slide the print cartridges (FIG. 2, 212) in the second direction (218) as the priming shuttle (424) moves in the second direction (218). That is, the printing system (FIG. 2, 208) may include a priming station (1038) which includes a pump to create a negative pressure and hoses to connect to the print cartridges (FIG. 2, 212). However, when in the position depicted in FIG. 10, the cap (102) may not exert forces to maintain a negative pressure environment around the printhead die. Accordingly, as depicted in FIG. 11, the protrusions (1036) move the cap sled (422) and priming shuttle (424) along the second direction (218) to raise the print cartridge (FIG. 2, 212) further to generate the desired higher capping force.

FIG. 11 is an isometric view of a printhead cap system (FIG. 1, 100) with a variable force printhead cap (FIG. 1, 102), according to an example of the principles described herein. As depicted in FIG. 11, the control system (FIG. 1. 106) has translated the priming shuttle (424) in a second direction (218) and due to the interaction between the pins (732-3, 732-4) in the priming shuttle (424) and the ramped slots (730-3, 730-4) in the base (426), the priming shuttle (424) not only translates in the second direction (218), is also at a higher position along the vertical direction (734). In an example, the cap (102) may be in this orientation when the print cartridge (FIG. 2, 212) is in a priming position.

Note that in the example depicted in FIGS. 10 and 11, the cap sled (422) is translationally coupled to the priming shuttle (424) in the second direction (218). That is, while the priming shuttle (424) has moved relative to the base (426) along the second direction (218), the cap sled (422) has not moved relative to the priming shuttle (424) along this second direction (218).

FIG. 12 is an exploded view of a cap (102) and a nonlinear spring (528), according to an example of the principles described herein. As described above, the nonlinear spring (528) may have different regions, each region with a different spring constant. The force exerted on the print cartridge (FIG. 2, 212) may be dependent upon the spring constant. For example, a spring constant of a first portion may be such that compression of the first portion results in a force of 1.5 N and the spring constant of the second portion may be such that compression of the second portion results in an additional force of 3.5 N on the print cartridge (FIG. 2, 212). The second portion may have a shorter spring compression distance as compared with the first portion.

To achieve the different spring constants, the different regions of the spring may have different properties. For example, the second portion of the nonlinear spring (528) may have a different length, pitch, or cross-sectional diameter than the first portion of the spring (528). As a particular example, the first portion and the second portion may have similar dimensions. For example, the portions may have a 0.45 millimeter (mm) diameter wire and 6.33 mm diameter spring. However, there may be more coils, for example eight, on a first portion than on the second portion, which may have five coils. In this example, the spring constant for the first or top portion may be 0.3 N per mm and the second or bottom portion may have a spring constant of 0.6 N per mm.

As described above, the nonlinear spring (528) may provide a third mechanism, which may be used independently or in conjunction with the previously described mechanisms, to generate multiple forces between the cap (102) and an associated print cartridge (FIG. 2, 212). For example, as the variable force capping station (FIG. 1, 104) is raised the interaction between the base (FIG. 4, 426) and the cap (FIG. 1, 102) may exert a first force on the print cartridge (FIG. 2, 212). As the variable force capping station (FIG. 1, 104) is further raised, the second portion of the spring is compressed and additional force, albeit at a different rate is applied at the print cartridge (FIG. 2, 212).

FIG. 13 is a cross-sectional view of a cap (FIG. 1, 102) and a nonlinear spring (528), according to an example of the principles described herein. Specifically. FIG. 13 depicts how the nonlinear spring (528) generates a force on the cap body (318) which compresses the elastomer seal (320) against the print cartridge (212).

Such systems and methods 1) provide different capping forces when the printing system is in different states, i.e., an idle but non-priming state and a priming state; 2) avoid repeated and long exposure to high capping forces on the printhead; 3) provide a controlled environment for the printhead when not in use; and 4) prevent nozzle dry out. However, it is contemplated that the systems and methods disclosed herein may address other matters and deficiencies in a number of technical areas.

What is claimed is:

1. A printhead cap system, comprising:
- a cap comprising an elastomer seal to surround a printhead die on a print cartridge;
- a variable force capping station to retain the cap utilizing a nonlinear spring disposed between the cap and a base of a cap sled, the variable force capping station to move the cap to:
  - a first position wherein the cap exerts a first force on a substrate on which the printhead die is disposed through compression of a first portion of the nonlinear spring; and
  - a second position wherein the cap exerts a second force on the substrate through compression of a second portion of the nonlinear spring, wherein the second force is greater than the first force; and
- a control system to raise the cap from an uncapped position through the first position and the second position.

2. The printhead cap system of claim 1, wherein, when in the second position the print cartridge is in a position to be primed.

3. The printhead cap system of claim 1, wherein:
- the variable force capping station further comprises:
  - a cap sled comprising a pin to interact with a ramped slot of a priming shuttle; and
  - the priming shuttle comprising the ramped slot to interact with the pin on the cap sled; and
- the control system is to move the cap sled in a first direction such that an interaction between the pin and the ramped slot is to move the cap sled and cap upwards towards the print cartridge.

4. The printhead cap system of claim 3, wherein the ramped slot comprises three stable positions.

5. The printhead cap system of claim 4, wherein:
- the variable force capping station further comprises:
  - a cap sled to retain the cap;
  - a priming shuttle comprising a pin to interact with a ramped slot of a base; and
  - the base comprising the ramped slot to interact with the pin on the priming shuttle; and
- the control system is to move the priming shuttle in a second direction such that an interaction between the pin and the ramped slot is to move the priming shuttle and cap upwards towards the print cartridge.

6. The printhead cap system of claim 1, wherein:
- the variable force capping station further comprises a nonlinear spring disposed between the cap and a base of the cap sled;
- compression of a first portion of the nonlinear spring provides the first force; and
- compression of a second portion of the nonlinear spring provides the second force.

7. The printhead cap system of claim 6, wherein the second portion of the nonlinear spring has a different length, pitch, and cross-sectional diameter than the first portion of the nonlinear spring.

8. A method, comprising:
- aligning a print cartridge of a printing system with a variable force capping station;
- elevating a cap through compression of a first portion of a nonlinear spring disposed between the cap and a base of a cap sled, comprising an elastomer seal to surround a printhead die of the print cartridge, to a first position to deform the elastomer seal against an underside of the print cartridge; and
- elevating the cap through compression of a second portion of the nonlinear spring to a second position to further deform the elastomer seal against the underside of the print cartridge.

9. The method of claim 8, wherein:
- the cap is in the first position when the print cartridge is inactive; and
- the cap is in the second position during printhead priming.

10. A printing system, comprising:
- a print cartridge to eject a fluid, wherein the print cartridge is to be moveable between a printing zone to a capping zone adjacent the printing zone; and
- a printhead cap system, comprising:
  - a cap comprising an elastomer seal to surround a printhead die on the print cartridge;
  - a variable force capping station comprising:
    - a cap sled to retain the cap and move in a first direction to interact with a priming shuttle ramped slot to raise the cap to a first position;
    - a nonlinear spring disposed between the cap and a base of the cap sled; and
    - a priming shuttle to retain the cap sled and move in a second direction to interact with a base ramped slot to raise the cap to a second position; and
  - a control system to move the cap sled and the priming shuttle in the first and second directions, respectively.

11. The printing system of claim 10, wherein the second direction is perpendicular to the first direction.

12. The printing system of claim 10, wherein the cap sled comprises a protrusion to interact with the print cartridge to slide the print cartridge in the second direction as the priming shuttle moves in the second direction.

13. The printing system of claim 10, wherein the priming shuttle is translationally coupled to a base in the first direction.

14. The printing system of claim 10, wherein the cap sled is translationally coupled to the priming shuttle in the second direction.

15. The printing system of claim 10:

further comprising a priming station; and wherein when the cap is in the second position, a pump of the priming station draws air through the printhead die of the print cartridge.

* * * * *